US007430213B2

(12) United States Patent
Marklund et al.

(10) Patent No.: US 7,430,213 B2
(45) Date of Patent: Sep. 30, 2008

(54) METHOD AND TELECOMMUNICATIONS NODE FOR DISTRIBUTION OF TERMINATING TRAFFIC WITHIN TELECOMMUNICATIONS NODE

(75) Inventors: Lars Marklund, Stockholm (SE); Lars Åke Lindholm, Tullinge (SE); Jouni Kemppainen, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 896 days.

(21) Appl. No.: 10/432,952

(22) PCT Filed: Oct. 31, 2001

(86) PCT No.: PCT/SE01/02383

§ 371 (c)(1),
(2), (4) Date: Sep. 22, 2003

(87) PCT Pub. No.: WO02/45366

PCT Pub. Date: Jun. 6, 2002

(65) Prior Publication Data

US 2004/0057429 A1    Mar. 25, 2004

(30) Foreign Application Priority Data

Nov. 29, 2000    (WO) ...................... PCT/SE00/02370

(51) Int. Cl.
*H04L 12/54* (2006.01)
(52) U.S. Cl. .................................................... 370/428
(58) Field of Classification Search ................ 370/401, 370/465, 466, 389, 216, 351, 352
See application file for complete search history.

(56) References Cited

U.S. PATENT DOCUMENTS 5,293,488 A * 3/1994 Riley et al. ................. 709/244

(Continued)

FOREIGN PATENT DOCUMENTS

JP    10093617    4/1998

(Continued)

OTHER PUBLICATIONS

Chan; A Framwework for Optimizing the Cost and Performance of Next-Generation IP Routers. In: IEEE Journal on Selected Areas in Communications, vol. 17, No. 6, Jun. 1999.

*Primary Examiner*—Kwang B. Yao
*Assistant Examiner*—Syed Bokhari
(74) *Attorney, Agent, or Firm*—Nixon & Vanderhye P.C.

(57) ABSTRACT

The present invention relates to a telecommunications node (60) that is able to handle IP-traffic and to terminate telecommunications traffic. The node includes a forwarding functionality with a number of forwarding engines (65). The node includes means for creating internal IP-hosts (61) for terminating IP-traffic within the node (60), each of which IP-host is attached to an IP-port (83) of a forwarding engine (65). The IP-hosts are each assigned an individual IP-address, which makes it possible to forward IP-traffic to the IP-hosts (61) by means of using the IP-address as a destination address for the IP-traffic. Information relating to the IP-addresses of the internal IP-hosts (61) is included in forwarding tables of the forwarding engines (65). It is possible to perform load distribution of terminating IP-traffic based on the IP-addresses of the internal IP-hosts.

16 Claims, 3 Drawing Sheets

U.S. PATENT DOCUMENTS

| | | | |
|---|---|---|---|
| 5,509,123 | A | 4/1996 | Dobbins et al. |
| 5,905,723 | A | 5/1999 | Varghese et al. |
| 5,951,649 | A * | 9/1999 | Dobbins et al. ............. 709/238 |
| 6,078,963 | A * | 6/2000 | Civanlar et al. ............. 709/238 |
| 6,157,644 | A * | 12/2000 | Bernstein et al. ............ 370/392 |
| 6,249,813 | B1 * | 6/2001 | Campion et al. ............ 709/222 |
| 6,768,738 | B1 * | 7/2004 | Yazaki et al. ............... 370/392 |
| 2001/0005369 | A1 * | 6/2001 | Kloth ........................ 370/392 |
| 2001/0032270 | A1 * | 10/2001 | Koo ........................... 709/237 |
| 2002/0004843 | A1 * | 1/2002 | Andersson et al. .......... 709/238 |
| 2003/0084219 | A1 * | 5/2003 | Yao et al. .................... 710/300 |

FOREIGN PATENT DOCUMENTS

| | | | | |
|---|---|---|---|---|
| SE | WO0038383 | * | 6/2000 | ................. 370/401 |
| WO | 00/38383 A2 | | 6/2000 | |

\* cited by examiner

METHOD AND TELECOMMUNICATIONS NODE FOR DISTRIBUTION OF TERMINATING TRAFFIC WITHIN TELECOMMUNICATIONS NODE

This application is the US national phase of international application PCT/SE01/02383 filed 31 Oct. 2001, which designated the US.

1. Field of the Invention

The present invention relates to telecommunications network nodes, such as IP-routers and Media Gateways in general and in particular to measures for making such nodes robust and flexible.

2. Background

It is today desirable to interconnect different types of telecommunications networks and provide users situated in different types of networks with an opportunity to communicate over these networks, despite differences in communications technology at the user endpoints. This is possible by means of inter alia Media Gateways. A Media Gateway is a telecommunications node that is able to interpret between and interconnect two different types of telecommunications networks. The Media Gateway may for instance interconnect a paclet-switched computer network based on IP (Internet Protocol) with PSTN, which is the traditional circuit-switched telephone network. Voice-over-IP is an example of a service that allows a user in the computer network to communicate with a user in the PSTN. The Media Gateway packs voice traffic from PSTN into IP-packets and sends them on to the computer network and vice versa, unpacks IP-packets from the computer network and converts their payload into voice traffic that is sent on to PSTN.

IP, the Internet Protocol, is a widely used protocol today, much due to the rapid growth of the Internet for which the protocol originally was designed. IP makes use of so called IP-addresses that are used to send data packets to the correct destination. The IP-addressing scheme is hierarchical An IP-address is a number made up of a number of bits. In the so-called version 4 of IP, the IP-address is a 32-bit number and in the so-called version 6 the IP-address is a 128-bit number. A number of the first bits in the IP-address are used as a network identifier and a number of the last bits are used as an interface identifier. The interface identifier may identify an interface of e.g. a host or a router. Two IP-hosts of IP version 4-type, which are connected to the same network, may for instance have interfaces associated with the IP-addresses 10.5.17.2 and 10.5.17.3 respectively. The addresses are written in the form of four numbers separated by dots. Each number represents an octet i.e.. an 8-bit number in the IP-address. The example shows that the first three octets of the two host interface addresses are the same. This signifies that the hosts are connected to the same network, or subnet. The hosts are both connected to a subnet identified by the subnet address 10.5.17.0. This subnet is in turn one of many subnets in the higher level subnet identified by the address 10.5.0.0.

An IP-router is a node that connects two or more physical IP-networks with each other and forwards IP-traffic between the different networks. The IP-router forwards information based on an IP destination address contained in each IP data packet The router keeps routing information in a routing table, which informs the router of where to send data packets marked with a particular destination address. In its simplest form an. IP-router will merely forward packets based on its destination address. More complex. IP-routers will in addition support more complex functions such as tunneling. An IP-router that supports tunneling must comprise functionality for tunnel termination. That is, it must comprise resources that provide the router with the ability to unpack data packets to retrieve address information in the packets.

A way in which IP-routers and Media Gateways are implemented is by placing functionality on a number of printed circuit boards (PCBs) which are interconnected by means of a backplane, which for instance may include a switch such as a TDM-switch or a cell-switch. Some boards may be provided with external interfaces on which external telecommunications traffic enters into the node or exits from the node. It may be of interest for telecommunications traffic entering the node on a first external interface, situated on a first PCB, to exit the node on a second external interface, situated on a second PCB. The function that forwards the telecommunications traffic from the first PCB via the backplane to the second PCB is called a forwarding engine (FE). The forwarding engine makes use of a forwarding table that contains information, which helps the FE to forward different traffic streams to the right PCB and connected interface. In order to make forwarding more efficient and to increase scalability it is today common to use so-called distributed forwarding engines. Distributed forwarding is described in the U.S. Pat. No. 5,509,123, wherein it is described that each network interface is provided with a forwarding engine. Each forwarding engine is capable of forwarding traffic independently of the other forwarding engines and each forwarding engine has its own forwarding table.

SUMMARY OF THE INVENTION

As mentioned above many telecommunications nodes, such as a Media Gateway or an IP-router, have the ability to terminate telecommunications traffic in the node. The traffic that should terminate in the node may for instance be IP-packets that should be terminated and transformed into PSTN-traffic in the case of a Media Gateway or traffic that has been tunneled and the tunnel is to terminate in the present node in the case of an IP-router. All traffic that is to terminate in the node should be processed in some way, which requires work from resources in the node. The type of resources needed depends on the type of traffic to be processed and how it is desirable to process it The resources in the node will have a limited capacity and it is therefore of interest to distribute the terminating traffic between the available resources. The present invention solves the problem of how to distribute traffic within a telecommunications node in a simple and robust manner.

An object of the present invention is to provide a telecommunications node that is able to handle IP-traffic and to terminate telecommunications traffic, which node includes means for simple and robust distribution of terminating traffic within the node.

Another object of the present invention is to provide a method for providing the telecommunications node with robust means for simple distribution of terminating traffic within the nodes.

The above stated objects are achieved by means of a telecommunications node as stated in claim 1, and by means of a method as stated in claim 9.

The telecommunications node according to the embodiment includes a forwarding functionality with at least one forwarding engine. The telecommunications node has means for creating internal IP-hosts, each of which is associated with an IP-port of a forwarding engine. The internal IP-hosts are assigned an IP-address each and are adapted for terminating traffic within the node, i.e. they are each associated with a resource for processing traffic that is to terminate within the node. According to an example method, a routing table manager is informed of the IP-address of the IP-host and the identity of the IP-port to which the IP-host is attached, when an IP-host has been created. The routing table manager can then update the forwarding tables of the forwarding engines so that it becomes possible to forward traffic to the IP-host. The IP-address of the IP-host can then be used as a destination address for terminating traffic that are to be processed in a resource associated with the IP-host.

An advantage with an example embodiment is that it provides means for load distribution wherein IP-addresses can be used to distribute the load. Since the node already is suited to handle IP-traffic there is no need to introduce specific functionality or internal protocols for load distribution of IP-packets, and there is no need for the forwarding engines of the node to look into higher order protocols in order to perform the load distribution. Instead of simply using an IP-address for distribution of the IP-traffic to the node, the IP-address can, according to an embodiment, also be used for load distribution within the node.

Another advantage of an embodiment is that it provides a simple mechanism for load distribution that is easy to configure and very robust. The embodiment provides a dynamic process of creating an internal IP-host for terminating traffic and attaching it to an IP-port of a forwarding engine. This makes the node very flexible since it becomes easy to create a new IP-host and to make it part of the traffic distribution system of the node.

A further advantage of an embodiment of the present invention is that it allows for the possibility to create a new IP-host and assigning it the IP-address of an old IP-host. This is advantageous if the old IP-host fails, since it makes it possible to maintain the internal function with very small adjustments. There is further no need to inform other telecommunications devices, with which the node communicates, of a new IP-address, since the IP-address of the old failed IP-host still can be used as destination address to direct traffic to the new IP-host In this respect the present invention increases the robustness of the node.

The possibility to move an IP-address of an IP-host can also be useful if it e.g. is detected that one of the device boards of the node is overloaded or nearly overloaded. If an IP-address of an IP-host on the overloaded device board is moved to an IP-host on another device board the overload situation may be resolved.

A further advantage of creating internal IP-hosts for terminating traffic within the node is that it allows for a simple and clean implementation of the forwarding engines. The forwarding engines will forward all telecommunications traffic in the same way based on IP-destination addresses irrespective of whether the destination address is the host interface address of an internal IP-host or an external IP-host situated outside the node. The example embodiment thus allows for distribution of terminating traffic within the node without requiring any extra abilities from the forwarding engines than their normal ability to forward IP-packets based on an IP-destination address.

The present invention will now be described in more detail by means of preferred embodiments and with reference to the accompanying drawings.

DETAILED DESCRIPTION

Figure 1:
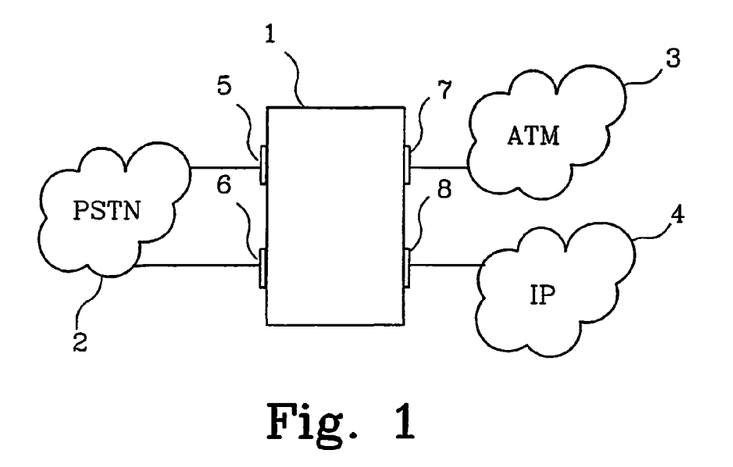
FIG. 1 is a schematic block diagram of a telecommunications node that interconnects a number of telecommunications networks.

As mentioned above an object of one or more example embodiments is to provide devices and methods for simple and robust distribution of terminating traffic within a telecommunications node. FIG. 1 shows a telecommunications node 1. In this example the node 1 is a combined IP-router and Media Gateway. The node interconnects three networks, namely a PSTN-network 2, an ATM-network 3 and an IP-network 4. The node 1 is connected to the networks 2-4 via interfaces 5-8. FIG. 1 shows two interfaces 5, 6 through which the node is connected to the PSTN-network 2, one interface 7 through which the node is connected to the ATM-network 3 and one interface 8 through which the node is connected to the IP-network 4. Only a few interfaces are shown in FIG. 1 for simplicity, but the number of interfaces connected to a network can in reality be very large. It can also be appreciated that the number and types of networks that the node interconnects may vary.

Figure 2:
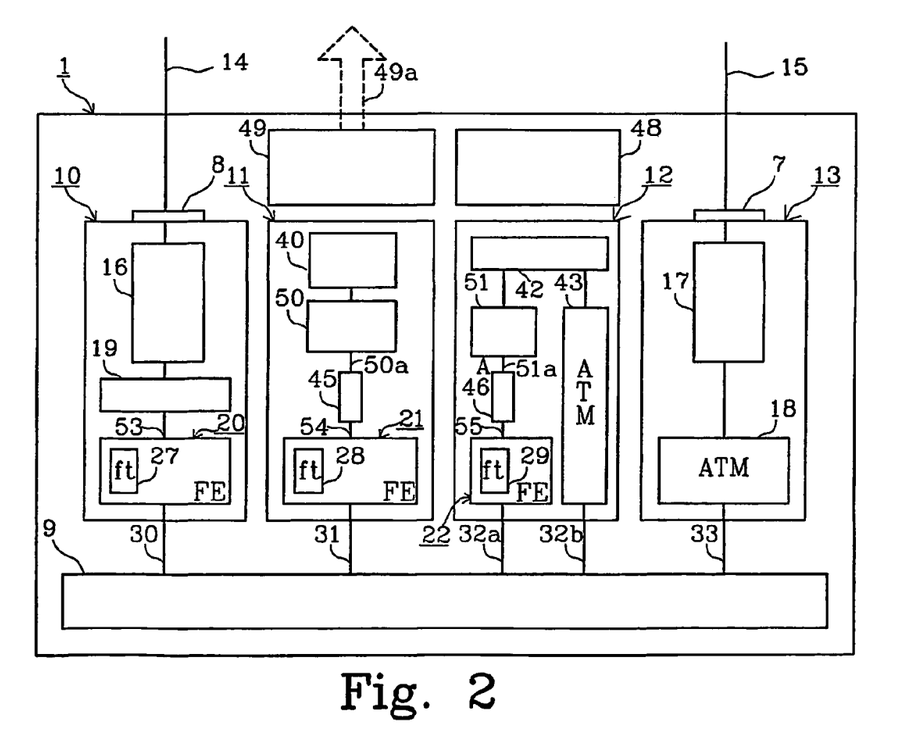
FIG. 2 is a schematic block diagram of a first embodiment of a telecommunications node according to the present invention.

FIG. 2 is a logic schematic block diagram of the node 1 according to an embodiment of the invention. The node 1 includes a backplane 9 that provides a full mesh interconnection between device boards of the node. A number of the node's device boards 10-13 are shown in FIG. 2. The device boards are connected to the backplane via internal interfaces 30, 31, 32a, 32b, 33. Two of the device boards 10, 13 shown have external interfaces 8, 7 through which the node is connected by external lines 14, 15 to the networks 3, 4 as shown in FIG. 1. The external lines 14, 15 are terminated on the device boards 10, 13 in line termination devices 16, 17 respectively. The device board 13 further includes an ATM-switching function 18, which is able to provide incoming and outgoing ATM-traffic with Virtual Connection Identifiers (VCI) that are suitable for forwarding ATM-traffic internally, within the node, or externally.

The board 10 further includes a link layer termination device 19 and a forwarding engine (FE) 20. The internal interface 30 is associated with the forwarding engine 20. The forwarding engine 20 is also associated with an IP-port 53. The term IP-port is used herein to denote an interface of a forwarding engine that is not an internal interface connected to the backplane, but an interface that, figuratively speaking, faces away from the backplane.

The task of the forwarding engine 20 is simply to forward IP-traffic to IP-ports (its own IP-port 53 or IP-ports of other forwarding engines 21, 22) based on information contained in a forwarding table 27. In the node 1, all device boards that handle IP-traffic are provided with a forwarding engine, which in this example means that the device board 11 is provided with a forwarding engine 21, with an associated forwarding table 28, and the device board 12 is provided with a forwarding engine 22, with an associated forwarding table 29. The forwarding engine 21 is associated with the internal interface 31 and an IP-port 54, and the forwarding engine 22 is associated with the internal interface 32a and an IP-port 55. The device board 13 is not provided with a forwarding engine since the board only handles ATM-traffic.

The device boards 11 and 12 have no external interfaces. They are boards that each includes resources for processing telecommunications traffic. These resources have a limited capacity. Even though FIG. 2 only shows two boards that include resources for processing telecommunications traffic, it is to be understood that the node 1 generally includes a large number of such boards including resources. Since the capacity of the resources is limited as mentioned, it is of interest to distribute traffic, i.e. load, between the resources so as to utilize the available capacity of the resources efficiently.

The resource or resources of the device board 11 is indicated as a general resource device 40, which for instance includes a protocol termination, a cross-connect function, a transcoder or some other type of processing resource. The resources of the device board 12 include inter alia a cross-connect device 42 and an ATM-termination device 43.

According to an example embodiment the boards 11 and 12 also include board internal IP-hosts 50, 51 associated with the resources of the device boards 11, 12 respectively. The IP-hosts 50, 51 are connected to the forwarding engines 21, 22 via board internal IP-subnets 45, 46 and IP-ports 54, 55 respectively. The IP-hosts 50, 51 are each assigned an IP-address, which herein also will be called host address. The host addresses are associated with interfaces 50a, 51a, which hereinafter will be called host interfaces. The host address of one of the IP-hosts 50, 51 can be used for addressing and forwarding of traffic to the resources associated with the IP-host. The resources that are associated with the IP-host are normally located on the same board as the IP-host but it is also possible for the associated resources to be located on a different board.

It is not essential to connect the IP-hosts 50, 51 to the forwarding engines 21, 22 via IP-subnets. The IP-subnets may for instance be replaced by a so-called host route. A host route can be seen as a subnet with a single address connected to it or as a point that connects to a host interface. A normal subnet is usually connected to, or can be connected to, several IP-addresses. The IP-subnet has a subnet address, while the host route does not have an address of its own.

The forwarding tables contain routing information regarding how the associated forwarding engine should transmit IP-packets on its internal interface or interfaces. The forwarding engines in FIG. 2 are all shown with only one internal interface leading to the backplane 9, but it is also possible for a forwarding engine to have more than one such interface. The routing information in the forwarding table tells the forwarding engine to which interface or IP-port it should forward packets marked with a particular destination address.

A routing table manager 48 determines the contents of the forwarding tables 27-29. If it is desirable to change how a forwarding engine forwards packets, the routing table manager provides the forwarding engines with updated forwarding tables. This process is well known to a person skilled in the art and will thus not be explained further herein.

The node 1 further includes a resource manager 49. The function of the resource manager will be explained below.

The way in which terminating traffic can be distributed within the node 1 through an example embodiment will now be explained in greater detail via an example and with reference to FIG. 1 and FIG. 2. Assume that a connection is to be set up between the IP-network 4 and the ATM-network 3 via the node 1 in order to send a stream of telecommunications traffic from the IP-network to the ATM-network and vice versa. In a set-up phase, it will be decided, by means of signaling, the resources in the node that are to be used to set up the requested connection. This set-up phase involves the resource manager 49. The resource manager 49 is able to communicate with telecommunications devices located in the networks 2-4 via at least one signaling channel 49a. The resource manager 49 has knowledge regarding the resources in the node. Such knowledge may include knowledge relating to the existence of the resource, the capacity of the resource, the current load of the resource etc. Based on this knowledge the resource manager determines a suitable set of resources to be used for the requested connection. It is for the current connection, among other things, necessary to use resources to convert IP-packets into ATM-cells. The resource manager knows that the resources 42 and 43 of the device board 12 are capable of performing this conversion and we assume in this example that the resource manager finds it suitable to place the load arising from the connection on these particular resources 42 and 43, rather than on some other resources of the same type. The resource manager knows that the IP-host 51 is associated with the resources 42 and 43 of the device board 12 and thus orders the IP-address. A of the IP-host 51 to be used as destination address for the IP-packets of the current connection, which should be sent from the IP-network 4 to the ATM-network 3. The order is sent to the telecommunications device in the IP-network 4 that assembles the IP-packets and provides them with a destination address.

Only the parts of the set-up phase that are of interest for explaining the present invention has been described above and this description is in addition much simplified. How a connection is set up between two networks via a Media Gateway is however well known to a person skilled in the art and a person skilled in the art is able to understand what steps have been overlooked or generalized in order to provide a simple and clear explanation of the present invention.

The IP-packets of the current connection will enter the node on the external line 14 that is terminated in line termination device 16. After link layer termination in the link layer termination device 19 the IP-packets will reach the forwarding engine 20. The forwarding engine 20 will simply have to look at the IP-destination address A of the IP-packets in order to be able to determine, by means of the forwarding table 27, to which interface 32a the IP-packets are to be forwarded initially. The packets are forwarded via the backplane and the internal interface 32a to the forwarding engine 22 of the board 12. The forwarding engine 22 finds, in its forwarding table 29, that the destination address A of the IP-packets means that the packets should be forwarded to the host interface 51a, via subnet 46. The IP-host 51 performs IP-termination on the packets and the cross-connect device 42 and the ATM-termination device 43 performs the remaining steps necessary for transforming the IP-packets into ATM-cells. The ATM-cells are then switched via the backplane to the ATM switching function 18, which then forwards the ATM-cells via the line termination device 17 and the external line 15 to the ATM-network 3.

The transformation of IP-packets into ATM-cells described above will also include intermediate steps not discussed herein but which are well known to a person skilled in the art. Such intermediate steps will e.g. involve protocols for channel identification. The host 51, the cross-connect device 42 and the ATM-termination device 43 includes functions for protocol processing, which are not explained in detail herein but which are known to a person skilled in the art.

As is apparent from the example described above load distribution is obtained by the resource manager 49 determining that an IP-address A of an internal IP-host 51 should be used as destination address for IP-packets of the connection. The resource manager 49 can thus distribute the load arising from a number of different connections between different resources and between different device boards in the node by ordering different host addresses to be used as destination address for the IP-packets of different connections. The IP-packets can according to an example embodiment of the invention be routed directly to a suitable resource based on the destination address that was originally included in the IP-packet. The forwarding engines will thus not be involved in the load distribution in any other way than its normal forwarding of packets to different interfaces based on IP-address information contained in the IP-packets. The forwarding engines 20-22 sees no conceptual difference between a normal external IP-host and the internal IP-hosts 50, 51. Thus the forwarding engines can be implemented to forward IP-packets, based on the destination address, in the same way, irrespective of whether the destination address is the host address associated with a internal IP-host or with an external IP-host. This provides for a simple and conceptually pure implementation of the forwarding engines 20-22.

The embodiment of the node 1 described above includes several device boards and a backplane, which interconnects the device boards. A device board will in most cases be a printed circuit board (PCB) on which a number of devices are fitted, but the term device board is here intended to also cover other physical realizations, such as a group of devices electrically connected by a cable instead of by a printed circuit board. The backplane in FIG. 2 is schematically shown as a physical entity separate from the device boards. In reality some of the functionality of the backplane is usually hosted on the device boards 10-13, as well as on device boards dedicated for backplane functionality. The function of the backplane is to provide all-to-all interconnection to the device boards 10-14. If the device boards are distributed the more traditional type of backplane can be replaced by a local network. There are however many ways in which to build a telecommunications node.

Figure 3:
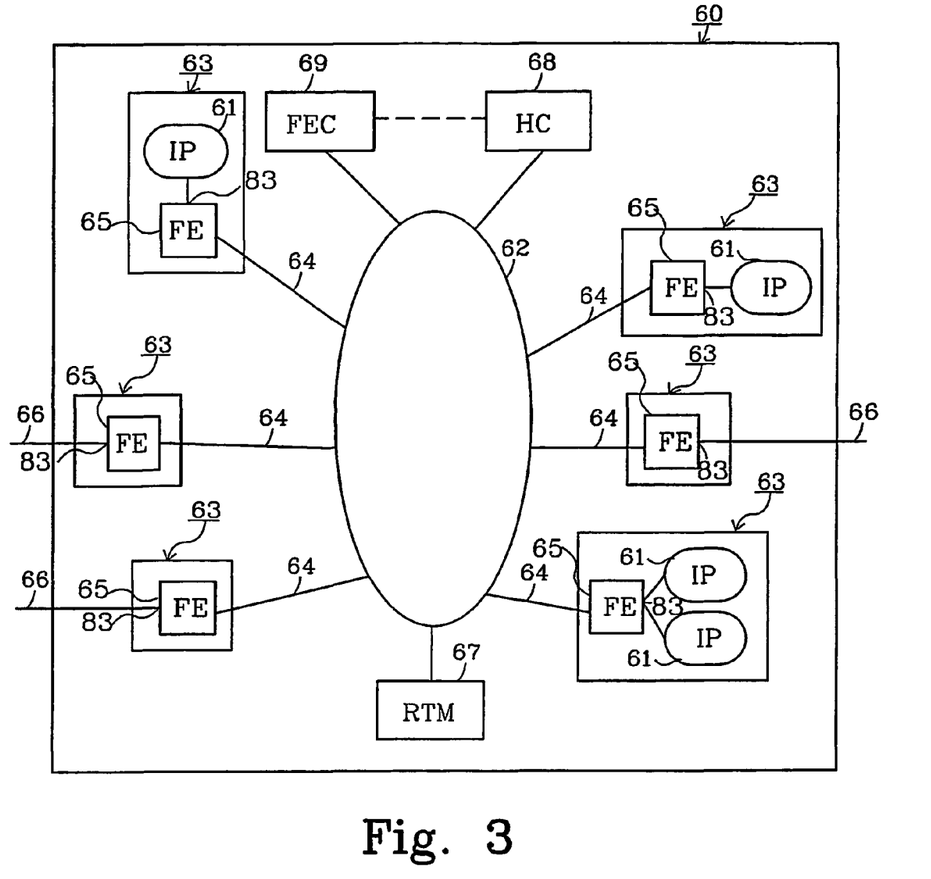
FIG. 3 is a schematic block diagram of a second embodiment of a telecommunications node according to the present invention.

The example embodiment can also be used in a telecommunications node without the traditional type of backplane or device boards and it might therefore be useful to present an alternative description of a telecommunications node in which the present invention may be used. FIG. 3 shows a more general and more simplified schematic block diagram of a telecommunications node 60 with a distributed forwarding functionality and internal IP-hosts 61 for terminating traffic within the node. The node has an internal communication network 62 that interconnects a number of processors 63. The internal communication network 62 may for instance be a traditional type backplane and the processors may be implemented by means of device boards of the types described above. The forwarding functionality comprises a number of forwarding engines 65 on the processors 63. Each forwarding engine 65 is connected to the internal communications network 62 by means of an internal interface 64. Some forwarding engines are also associated with external interfaces 66 that lead to external telecommunications devices. Other forwarding engines are associated with the internal IP-hosts 61 for terminating traffic within the node. The forwarding engines are associated with the external interfaces 66 or the internal IP-hosts via IP-ports 83. The IP-hosts 61 are as explained above associated with resources for processing the traffic that is to terminate within the node, but these resources are for the sake of simplicity not shown in FIG. 3. As explained above the forwarding engines 65 forward traffic that is to terminate within the node to the IP-hosts. Each IP-host is assigned an individual IP-address, which is used to direct traffic to the different IP-hosts. The forwarding engines 65 obtain information regarding how to forward traffic from their forwarding tables (not shown in FIG. 3), as described above. A routing table manager 67 determines the contents of the forwarding tables.

The advantages that the internal IP-hosts 61 can provide have been explained above in connection with FIG. 2. However there is a possibility that an IP-host, a forwarding engine or an IP-port fails so that an IP-host can not be reached. It is also possible that a failure arises that causes overload on one or several device boards of the node. It is therefore desirable to provide the node with mechanisms for handling such failure situations and minimize their negative impact on the handling of traffic within the node. The present invention provides a dynamic process of creating an internal IP-host for terminating traffic and attaching it to an IP-port of a forwarding engine. This makes the node very flexible and robust since it becomes easy to create a new IP-host and to make it part of the traffic distribution system of the node. A new IP-host can replace a failed IP-host or can be created to off-load other IP-hosts.

Figure 4:
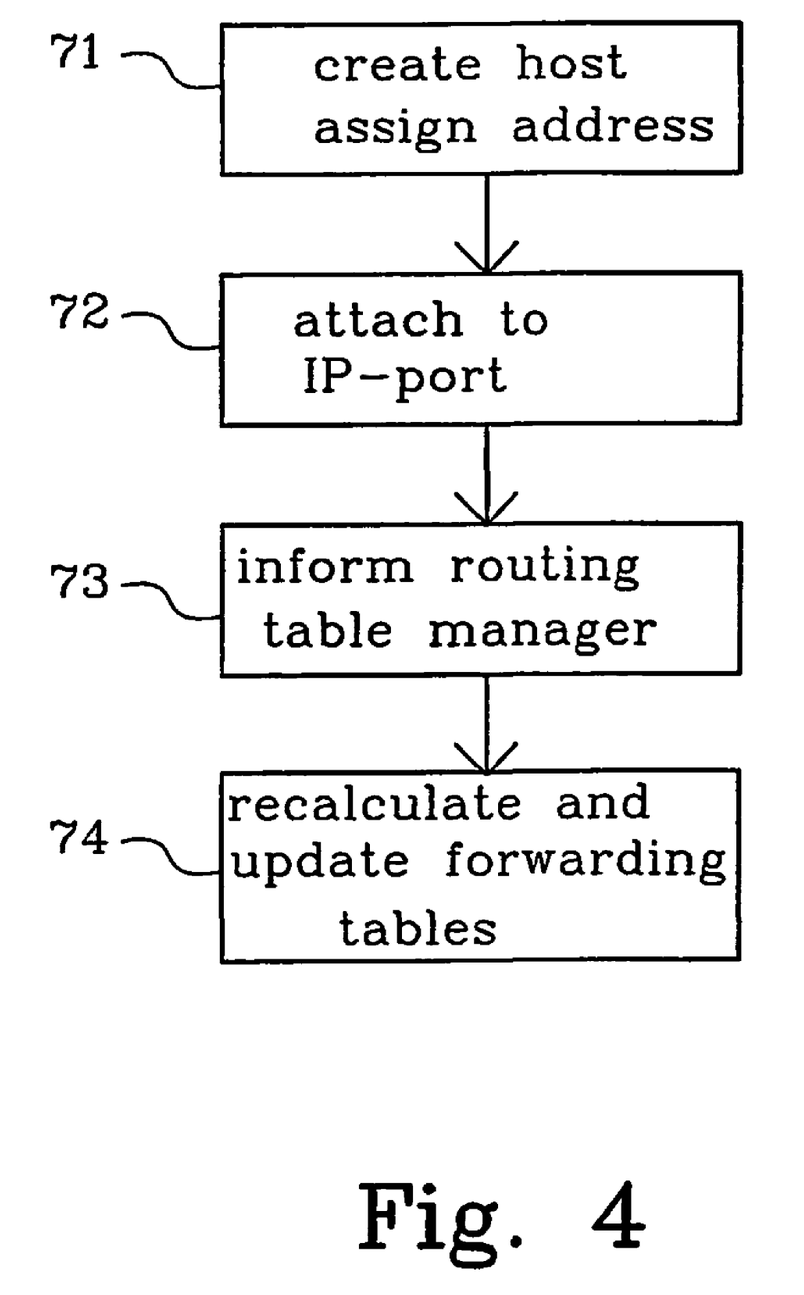
FIG. 4 is a flow diagram illustrating an example method.

The dynamic process of creating an internal IP-host and attaching it to an IP-port of a forwarding engine will now be described with reference to FIG. 3 and the flow diagram of FIG. 4. In a first step 71 the IP-host is created and assigned an IP-address. It is preferred that the node be provided with a capacity for creating the IP-host. Such capacity can include logic on the processor that is prepared such that it can be activated as an IP-host. The activation of this logic is preferably handled by a host controller 68. The host controller decides on which processor the IP-host should be created and supervises the configuration of the IP-host and provides the necessary configuration data such as standard parameters for IP-hosts and the IP-address to be assigned to the IP-host. Configuration of IP-hosts is well known in the art and is therefore not discussed in greater detail herein.

The created IP-host is then attached to an IP-port of the forwarding engine on the processor on which it has been created, step 72. It is preferred that the forwarding engine thus be prepared with one or several IP-ports for attaching IP-hosts. It is possible to attach more than one IP-host to a single IP-port. The attachment procedure is preferably performed by means of sending a message to the forwarding engine that contains the IP-address of the created IP-host The message to the forwarding engine may e.g. be sent from the created IP-host itself or from the host controller 68.

In order to make it possible to forward terminating traffic to the created IP-host the forwarding tables of the forwarding engines have to be updated to include information relating to the created IP-host. For this reason a message is sent to the routing table manager, step 73, after the created IP-host has been attached to one of the forwarding engines. The routing table manager is thereby informed of the existence of the created IP-host, its address and the identity of the IP-port to which it is attached. The forwarding engine may be arranged to send the message to the routing table manager in response to an IP-host being attached to one of its IP-ports.

The routing table manager can then recalculate the forwarding tables and send a forwarding table update message to all the forwarding engines in the system, step 74. The routing table manager will also, if needed, send routing messages out to external telecommunications devices announcing that the IP-address of the created IP-host is reachable from this node 60.

When the forwarding tables of the forwarding engines have been updated, it is possible to direct terminating traffic to the created IP-host and to resources, which the created IP-host was associated with when it was configured. This is possible by means of using the IP-address of the created IP-host as the destination address for the terminating traffic as explained above.

The process of creating internal IP-host described above makes it possible to automatically create and begin using a new IP-host without requiring manual configuration. This makes the system flexible and robust. An operator of the node can easily initiate the creation of a new IP-host by means of giving a command to the host controller to create a new IP-host and attach it to a particular forwarding engine. This makes it easy to provide a newly added processor with an IP-host and thereby start using the newly added processor for terminating traffic within the node. It is according to the invention possible to perform the process of creating a new IP-host while the node 60 is in operation, i.e.. while the node handles telecommunications traffic, such that the negative impact on the traffic being handled is minimal.

It would be advantageous if a failure of an IP-host or a failure that makes an IP-host unreachable could be detected so that a new IP-host can be created to replace the old IP-host, which has failed or become unreachable. There are three main fault situations that are of interest to detect: a failure of an IP-host, a failure of a forwarding engine or a failure of an IP-port It is also possible that several units on the same processor fail at the same time. The host controller may be arranged to supervise all the IP-hosts of the node to detect if one of them fails. A forwarding engine controller 69 may be provided to supervise the forwarding engines to detect a possible failure of one of them or of one of their IP-ports. The supervision of the IP-hosts and forwarding engines may be performed by means of known polling or heartbeat techniques.

Figure 5:
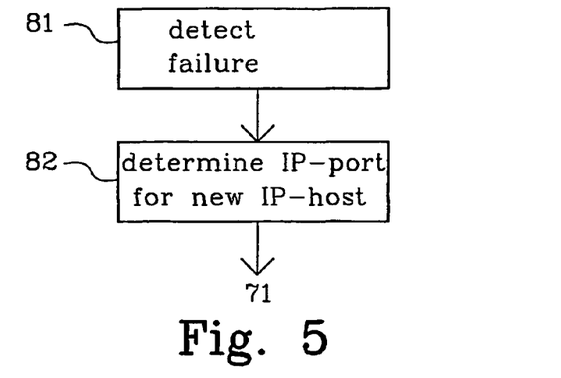
FIG. 5 is a flow diagram illustrating an alternative method according to the present invention.

A method of how to create a new IP-host to replace an old IP-host, which has failed or become unreachable, will now be described with reference to the flow diagram of FIG. 5. In a first step 81 the failure of a forwarding engine, an IP-host and/or an IP-port is detected in the forwarding engine controller 69 and/or host controller 68. The host controller and/or forwarding engine controller informs the routing table manager of the failure so that the routing table manager can take the steps necessary to update the forwarding table so that no traffic continues to be forwarded to the failed forwarding engine and/or IP-host If the forwarding engine controller has detected a failure it also informs the host controller of the failure it has detected. When the host controller becomes aware of the failure, it determines to which IP-port a new IP-host to replace the old IP-host should be attached, step 82. The new IP-host is then created according to the process described above in connection to FIG. 4. The new IP-host is assigned the IP-address of the old IP-host.

If it was the old IP-host or the IP-port to which it was attached that failed, the new IP-host can be attached to another IP-port on the same forwarding engine as the old IP-host. However if the forwarding engine failed an IP-port of a different forwarding engine will be chosen.

The host controller may be arranged to take a number of factors into consideration when determining to which IP-port on which forwarding engine the new IP-host is to be attached. If the old IP-host failed but the forwarding engine to which it was attached still is operative the host controller may be arranged to attach the new IP-host to the same forwarding engine. If the IP-port to which the old IP-host was attached failed the new IP-host may be attached to another IP-port of the same forwarding engine. Alternatively or if the forwarding engine of the old IP-host has failed the host controller may be arranged to determine the forwarding engine of the new IP-host based on information relating to the load distribution within the node. An important factor to take into consideration when determining the IP-port and the forwarding engine is that it should be possible to associate the new IP-host to the same type or corresponding type of resources for processing terminating traffic as were associated with the old IP-host. The processor on which the new IP-host is to be created should therefore be provided with such resources or it should be possible to create such resources in connection with the creation of the new IP-host.

In an alternative embodiment the old IP-host is associated with back-up information that relates to an IP-port to which it is suitable to attach a new IP-host to replace the old IP-host in case of failure. The configuration data of the IP-host may then include information regarding the identity of a primary IP-port and a secondary IP-port. The IP-host is attached to the primary IP-port when it is created. The information regarding the secondary IP-port is used if the IP-host fails. A new IP-host is then created to replace the old IP-host. The new IP-host is attached to the secondary IP-port and assigned the IP-address of the old IP-host In this case the host controller will be arranged to check, in case of failure, the information associated with the old IP-host that relates to the secondary IP-port and create the new IP-host such that it is attached to the secondary IP-port. Which IP-port of which forwarding engine to associate with an IP-host as primary and secondary IP-port may be determined by the host controller based for instance on the factors discussed above, or by an operator of the node by means of a command to the host controller.

The methods for creating a new IP-host to replace an old IP-host can also be used in cases where the old IP-host is still operative and reachable but it is desirable to make rearrangements within the node. Such rearrangements may be desirable if it is detected that the load distribution within the node can be improved by means of moving an IP-host (i.e. replacing an old IP-host with a new IP-host somewhere else in the node). An overload of a processor should not arise if the load distribution mechanisms function properly, but if an error occurs a processor may become overloaded and it might be possible to resolve this overload situation by means of moving an IP-host from the overloaded processor. The host controller may thus be arranged to create a new IP-host to replace an old IP-host in response a command from the operator of the node or in response to an overload message from a load controller of the node.

When a new IP-host is created to replace an old IP-host, it is important that the old IP-host is detached and/or shut down. If the new IP-host is created because the old IP-host has failed, it is important to make sure that a conflict between the new and old IP-host will not arise if the old IP-host comes back alive. Thus when the new IP-host is assigned the IP-address of the old IP-host, the old IP-host must be deprived of its address, since a conflict would arise if two IP-hosts were to be associated with the same IP-address.

The possibility to create a new IP-host and assign the IP-address of an old failed or unreachable IP-host to the new IP-host is advantageous since it reduces the need for new IP-addresses and the need to inform external telecommunication addresses that a new IP-address is reachable within the node.

The arrangements according to the present invention that has been described above can be used in many different types of telecommunications nodes that are able to handle IP-traffic and to terminate IP-traffic. Examples of such telecommunications nodes are Media Gateways, IP-routers, Radio Base Stations, Radio Network Controllers and nodes that are a combination of any of the mentioned types of nodes.

The invention claimed is:

1. A telecommunications node with the ability to handle IP-traffic and to terminate telecommunications traffic, comprising:
   a forwarding functionality comprising at least one forwarding engine;
   a routing table manager;
   means for creating an IP-host for terminating the IP-traffic in the telecommunications node, wherein the created IP-host is assigned an IP-address;
   means for attaching the created IP-host to an IP-port of one of the at least one forwarding engine;
   means for sending a message to the routing table manager in response to the created IP-host being attached to the IP-port of one of the at least one forwarding engine, wherein the message includes information relating to the identity of the IP-port and to the IP-address of the created IP-host,
   wherein the means for creating the IP-host are arranged to create a first IP-host, which is assigned a first IP-address and is attached to a first IP-port and to subsequently create a second IP-host attached to a second IP-port and assign the first IP-address to the second IP-host instead of to the first IP-host,
   means for selecting the second IP-port, to which the second IP-host is to be attached, based on load information regarding a load distribution in the telecommunications mode.

2. The telecommunications node of claim 1, further comprising means for detecting a failure of one or several of the at least one forwarding engine, the first IP-host and the first IP-port,
   wherein the means for creating the IP-host are arranged to create the second IP-host in response to the detected failure of the one or several of the at least one forwarding engine, the first IP-host and the first IP-port.

3. The telecommunications node of claim 1,
   wherein the routing table manager is arranged to perform a forwarding table recalculation in response to reception of the message with the information relating to the IP-port identity and to the IP-address, and
   wherein the routing table manager is arranged to send a forwarding table update message based on the recalculation to each forwarding engine of the telecommunications node.

4. The telecommunications node of claim 1, wherein the means for attaching the created IP-host to the IP-port are means of the created IP-host for sending an attach message to the forwarding engine of the IP-port, wherein the attach message includes the address assigned to the IP-host.

5. The telecommunications node of claim 1, wherein the means for creating the IP-host, the means for attaching the created IP-host to the IP-port and the means for sending the message to the routing table manager are arranged to operate while the telecommunications node is in operation with respect to handling the telecommunications traffic.

6. The telecommunications node of claim 1, wherein the IP-address assigned to the created IP-host is different from IP-addresses assigned to other active IP-hosts in the node.

7. The telecommunications node of claim 1, further comprising means for disassociating the first IP-address from the first IP-host.

8. A telecommunications node with the ability to handle IP-traffic and to terminate telecommunications traffic, comprising:
   a forwarding functionality comprising at least one forwarding engine;
   a routing table manager;
   means for creating an IP-host for terminating the IP-traffic in the telecommunications node, wherein the created IP-host is assigned an IP-address;
   means for attaching the created IP-host to an IP-port of one of the at least one forwarding engine; and
   means for sending a message to the routing table manager in response to the created IP-host being attached to the IP-port of one of the at least one forwarding engine, wherein the message includes information relating to the identity of the IP-port and to the IP-address of the created IP-host,
   wherein the means for creating the IP-host are arranged to create a first IP-host, which is assigned a first IP-address and is attached to a first IP-port and to subsequently create a second IP-host attached to a second IP-port and assign the first IP-address to the second IP-host instead of to the first IP-host,
   wherein the means for creating the IP-host are arranged to associate back-up information with the first IP-host upon creation of the first IP-host, wherein the back-up information relates to the identity of the second IP-port, and
   wherein the telecommunications node further includes means for selecting the second IP-port, to which the second IP-host is to be attached, based on the back-up information.

9. A method in a telecommunications node with the ability to handle IP-traffic and to terminate telecommunications traffic, comprising:
   creating a first IP-host for terminating the IP-traffic in the telecommunications node and assigning a first IP-address to the first IP-host;
   attaching the first IP-host to a first IP-port of a first forwarding engine, wherein the first forwarding engine is one of at least one forwarding engine of a forwarding functionality of the telecommunications node;
   sending a first message to a routing table manager of the telecommunications node in response to the attachment of the first IP-host to the first IP-port, wherein the first message includes information relating to the identity of the first IP-port and to the first IP-address;
   creating a second IP-host for terminating the IP-traffic in the telecommunications node and assigning the first IP-address to the second IP-host instead of to the first IP-host;
   attaching the second IP-host to a second IP-port of one of the at least one forwarding engine;
   sending a second message to the routing table manager in response to the attachment of the second IP-host to the second IP-port, wherein the second message includes information relating to the identity of the second IP-port and to the first IP-address; and
   selecting the second IP-port, to which the second IP-host is to be attached, based on load information regarding a load distribution in the telecommunications node.

10. The method of claim 9, further comprising detecting a failure of one or several of the first forwarding engine, the first IP-host and the first IP-port,
   wherein the step of creating the second IP-host is performed in response to detection of the failure of the one or several of the first forwarding engine, the first IP-host and the first IP-port.

11. The method of claim 9, further comprising:
   performing, via the routing table manager, a forwarding table recalculation in response to a reception of the first message with the information relating to the first IP-port identity and to the first IP-address; and sending, via the routing table manager, a forwarding table update message based on the recalculation to each forwarding engine of the telecommunications node.

12. The method of claim 9, wherein the steps of attaching the first IP-host to the first IP-port is performed by the first IP-host sending an attach message to the forwarding engine of the first IP-port, wherein the attach message includes the address assigned to the first IP-host.

13. The method of claim 9, wherein the step of creating the first IP-host, the step of attaching the first IP-host to the first IP-port and the step of sending the message to the routing table manager are performed while the telecommunications node is in operation with respect to handling the telecommunications traffic.

14. The method of claim 9, wherein the first IP-address assigned to the first IP-host is different from IP-addresses assigned to other active IP-hosts in the node.

15. The method of claim 9, further comprising disassociating the first IP-address from the first IP-host.

16. A method in a telecommunications node with the ability to handle IP-traffic and to terminate telecommunications traffic, comprising:

creating a first IP-host for terminating the IP-traffic in the telecommunications node and assigning a first IP-address to the first IP-host;

attaching the first IP-host to a first IP-port of a first forwarding engine, wherein the first forwarding engine is one of at least one forwarding engine of a forwarding functionality of the telecommunications node;

sending a first message to a routing table manager of the telecommunications node in response to the attachment of the first IP-host to the first IP-port, wherein the first message includes information relating to the identity of the first IP-port and to the first IP-address;

creating a second IP-host for terminating the IP-traffic in the telecommunications node and assigning the first IP-address to the second IP-host instead of to the first IP-host:

attaching the second IP-host to a second IP-port of one of the at least one forwarding engine;

sending a second message to the routing table manager in response to the attachment of the second IP-host to the second IP-port, wherein the second message includes information relating to the identity of the second IP-port and to the first IP-address; and selecting the second IP-port, to which the second IP-host is to be attached, based on back-up information associated with the first IP-host, wherein the back-up information relates to the identity of the second IP-port and wherein the back-up information is associated with the first IP-host upon creation of the first IP-host.

* * * * *